(12) United States Patent
Chmiel et al.

(10) Patent No.: US 9,419,836 B2
(45) Date of Patent: Aug. 16, 2016

(54) APPARATUS, METHODS, AND COMPUTER PROGRAM PRODUCTS PROVIDING AN INDICATION OF CYCLIC PREFIX LENGTH

(75) Inventors: Mieszko Chmiel, Glucholazy (PL); Przemyslaw Jan Czerepinski, Totton (GB); Kaj Jansen, Salo (FI)

(73) Assignee: Nokia Solutions and Networks Oy, Espoo (FI)

( * ) Notice: Subject to any disclaimer, the term of this patent is extended or adjusted under 35 U.S.C. 154(b) by 431 days.

(21) Appl. No.: 12/386,743

(22) Filed: Apr. 21, 2009

(65) Prior Publication Data

US 2009/0270122 A1 Oct. 29, 2009

Related U.S. Application Data

(60) Provisional application No. 61/125,440, filed on Apr. 25, 2008.

(51) Int. Cl.
*H04L 5/00* (2006.01)
*H04L 27/26* (2006.01)
*H04J 11/00* (2006.01)

(52) U.S. Cl.
CPC ......... *H04L 27/2607* (2013.01); *H04J 11/0093* (2013.01)

(58) Field of Classification Search
CPC . H04L 5/0007; H04L 5/0048; H04L 27/2675; H04L 27/2678
USPC ........ 455/550.1; 375/260, 295, 342; 370/342, 370/512
See application file for complete search history.

(56) References Cited

U.S. PATENT DOCUMENTS

| | | | |
|---|---|---|---|
| 7,859,988 B2 * | 12/2010 | Yang et al. | 370/208 |
| 2004/0268206 A1 | 12/2004 | Kim et al. | |
| 2006/0250940 A1 * | 11/2006 | Tirkkonen et al. | 370/208 |
| 2006/0285483 A1 | 12/2006 | Khan | |
| 2008/0019314 A1 * | 1/2008 | Gorokhov et al. | 370/330 |
| 2008/0043613 A1 | 2/2008 | Yang et al. | 370/208 |
| 2008/0081603 A1 | 4/2008 | Cho et al. | 455/422.1 |
| 2008/0084613 A1 | 4/2008 | Zou | |
| 2008/0084845 A1 | 4/2008 | Kuchibhotla et al. | 370/331 |
| 2008/0095277 A1 | 4/2008 | Cheng | 375/340 |
| 2010/0172235 A1 | 7/2010 | Liu et al. | |

FOREIGN PATENT DOCUMENTS

| | | |
|---|---|---|
| KR | 20080016390 A | 2/2008 |
| RU | 2352073 C2 | 4/2009 |

(Continued)

OTHER PUBLICATIONS

3GPP TS 36.211, V8.2.0 (Mar. 2008), $3^{rd}$ Generation Partnership Project; Technical Specification Group Radio Access Network; Evolved Universal Terrestrial Radio Access (E-UTRA); Physical Channels and Modulation (Release 8).

(Continued)

*Primary Examiner* — Lincoln Donovan
*Assistant Examiner* — Colleen O Toole
(74) *Attorney, Agent, or Firm* — Harrington & Smith (57) ABSTRACT

In one exemplary embodiment, a method includes: inserting an indication of a cyclic prefix length into a transmission; and sending the transmission. In another exemplary embodiment, a method includes: receiving a transmission; and processing the received transmission to obtain an indication of a cyclic prefix length.

16 Claims, 6 Drawing Sheets

(56) References Cited

FOREIGN PATENT DOCUMENTS

| WO | WO 2008/038958 A3 | 4/2008 |
| WO | WO-2008/084634 A1 | 7/2008 |
| WO | WO-2008/151302 A1 | 12/2008 |
| WO | WO-2008/155380 A2 | 12/2008 |
| WO | WO-2009/023792 A1 | 2/2009 |

OTHER PUBLICATIONS

3GPP TS 36.214, V8.2.0 (Mar. 2008), $3^{rd}$ Generation Partnership Project; Technical Specification Group Radio Access Network; Evolved Universal Terrestrial Radio Access (E-UTRA); Physical layer-Measurements (Release 8).

3GPP TS 36.300, V8.6.0 (Sep. 2008), $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

3GPP TSG-RAN Working Group 1 #52 "Way Forward on Scrambling Sequence Initialisation" Sorrento, Italy, Feb. 11-15, 2008. R1-081106.

ETSI EN 300 744 V1.5.1 Digital Video Broadcasting (DVB); Framing Structure, Channel Coding and Modulation for Digital Terrestrial Television (Jun. 2004).

* cited by examiner

APPARATUS, METHODS, AND COMPUTER PROGRAM PRODUCTS PROVIDING AN INDICATION OF CYCLIC PREFIX LENGTH

CROSS-REFERENCE TO RELATED APPLICATIONS

This patent application claims priority under 35 U.S.C. §119(e) from U.S. Provisional Patent Application No. 61/125,440, filed Apr. 25, 2008, the disclosure of which is incorporated by reference herein in its entirety.

TECHNICAL FIELD

The exemplary and non-limiting embodiments of this invention relate generally to wireless communication systems, methods, devices and computer programs and, more specifically, relate to cyclic prefix length detection.

BACKGROUND

The following abbreviations that may be found in the specification and/or the drawing figures are defined as follows:
 3GPP third generation partnership project
 BS base station
 BW bandwidth
 CP cyclic prefix
 DL downlink (eNB towards UE)
 eNB E-UTRAN Node B (evolved Node B)
 EPC evolved packet core
 E-UTRAN evolved UTRAN (LTE)
 FDMA frequency division multiple access
 ID identity/identification
 LTE long term evolution of UTRAN (E-UTRAN)
 MAC medium access control (layer 2, L2)
 MBSFN multicast/broadcast single frequency network
 MM/MME mobility management/mobility management entity
 Node B base station
 OFDM orthogonal frequency division multiplexing
 OFDMA orthogonal frequency division multiple access
 O&M operations and maintenance
 PDCP packet data convergence protocol
 PHY physical (layer 1, L1)
 PSS primary synchronization signal
 QPSK quadrature phase-shift keying
 RLC radio link control
 RRC radio resource control
 RRM radio resource management
 RS reference signal
 RSRP reference signal received power
 RSRQ reference signal received quality
 S-GW serving gateway
 SC-FDMA single carrier, frequency division multiple access
 SSS secondary synchronization signal
 TDD time division duplex
 TS technical specification
 UE user equipment, such as a mobile station or mobile terminal
 UL uplink (UE towards eNB)
 UTRAN universal terrestrial radio access network A communication system known as evolved UTRAN (E-UTRAN, also referred to as UTRAN-LTE or as E-UTRA) is currently under development within the 3GPP. As presently specified the DL access technique will be OFDMA, and the UL access technique will be SC-FDMA.

One specification of interest is 3GPP TS 36.300, V8.6.0 (2008-09), "3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8)," incorporated by reference herein in its entirety.

Figure 1:
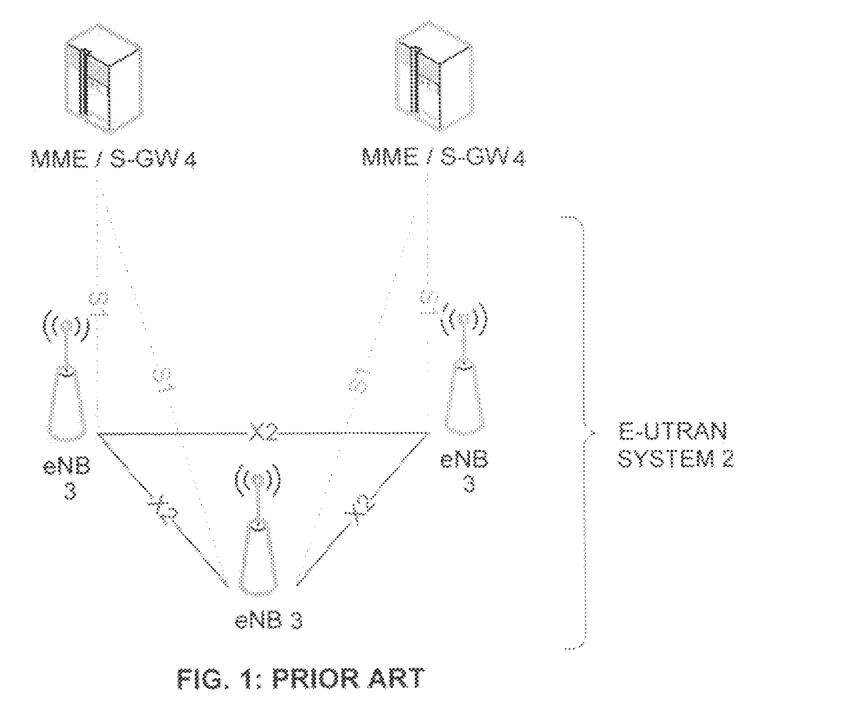
FIG. 1 reproduces FIG. 4 of 3GPP TS 36.300 V8.6.0, and shows the overall architecture of the E-UTRAN system.

FIG. 1 reproduces FIG. 4.1 of 3GPP TS 36.300 V8.6.0, and shows the overall architecture of the E-UTRAN system 2. The E-UTRAN system 2 includes eNBs 3, providing the E-UTRAN user plane (PDCP/RLC/MAC/PHY) and control plane (RRC) protocol terminations towards the UE (not shown). The eNBs 3 are interconnected with each other by means of an X2 interface. The eNBs 3 are also connected by means of an S1 interface to an EPC, more specifically to a MME by means of a S1 MME interface and to a S-GW by means of a S1U interface (MME/S-GW 4). The S1 interface supports a many-to-many relationship between MMEs/S-GWs and eNBs.

The eNB hosts the following functions:
 functions for RRM: RRC, Radio Admission Control, Connection Mobility Control, Dynamic allocation of resources to UEs in both UL and DL (scheduling);
 IP header compression and encryption of the user data stream;
 selection of a MME at UE attachment;
 routing of User Plane data towards the EPC (MME/S-GW);
 scheduling and transmission of paging messages (originated from the MME);
 scheduling and transmission of broadcast information (originated from the MME or O&M); and
 a measurement and measurement reporting configuration for mobility and scheduling.

To reduce or avoid reception problems for multi-path radio signals, a symbol (e.g., an OFDM symbol) may be extended by a CP. At the transmitter, the last part of an OFDM symbol is inserted at the beginning of the same OFDM symbol. At the receiver, after synchronization the CP of the OFDM symbol is ignored. If two signals are received due to multi-path issues, the switch between two consecutive OFDM symbols in the delayed signal should occur within the CP and thus should not cause a problem (e.g., interference). While a CP may slightly reduce the effective throughput (i.e., due to repetition of data), use of a CP provides a more robust signal that is more resistant to data errors, such as those caused by multi-path reception.

In addition to a "normal" CP, E-UTRAN also provides for an "extended" CP having a greater length/duration. The extended CP is defined for large cell scenarios with higher delay spread and MBMS transmission. For example, as was specified for Δf=15 kHz (specified in TS 36.211 V8.2.0, see below for complete citation), the length of the normal CP is 160 samples for the first symbol and 144 samples for other symbols within a 0.5 ms slot (approximately 5 microseconds), while the extended CP is 512 samples long (approximately 17 microseconds).

The length of the CP is detected blindly by the UE (e.g., from the time distance between the PSS and the SSS). However, due to timing issues with neighbor cells, the CP length may be detected incorrectly by the UE during cell search. Two error cases will be considered. For these error cases, assume that the UE is searching/measuring a first cell ("the searched/measured cell") in the presence of a second cell ("the neighbor cell"). Furthermore, as specified in the error cases, assume that the searched/measured cell and the neighbor cell use two different CP lengths, for example, the normal CP length and the extended CP length (i.e., a CP having a different length than the normal CP).

Figure 3:
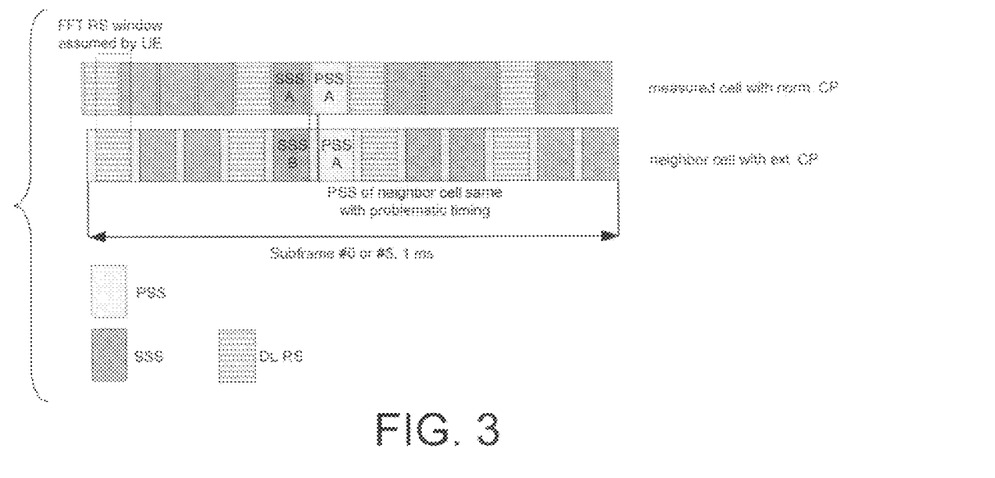
FIG. 3 illustrates a first error case regarding CP length misdetection for a FDD system.
Figure 4:
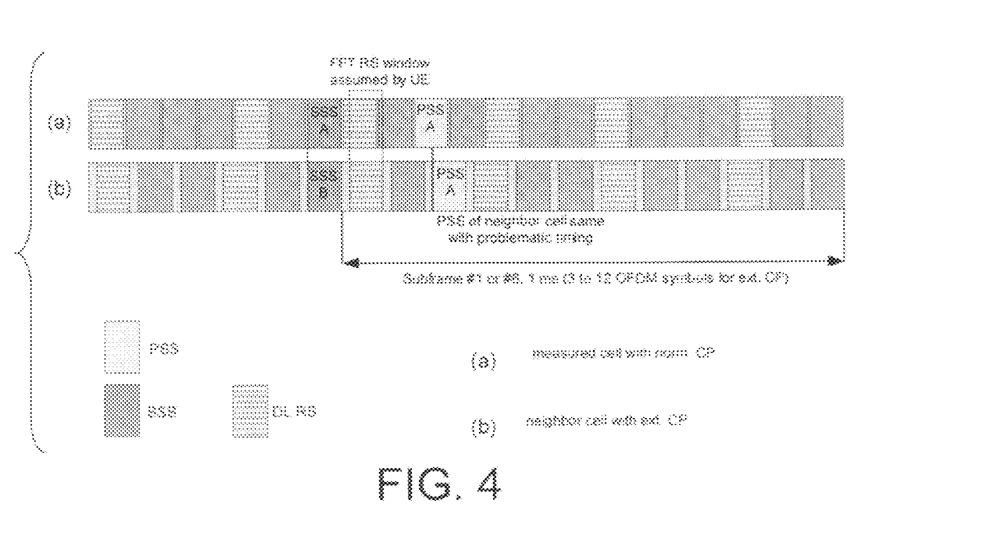
FIG. 4 shows the first error case regarding CP length misdetection for a TDD system.

(i) The searched/measured cell has a normal CP while the neighbor cell has an extended CP. The neighbor cell uses the same PSS code as the searched/measured cell and the reception timing of the searched/measured cell's PSS is based on the extended CP length instead of the normal CP length. FIG. 3 illustrates the first error case for a FDD system. FIG. 4 shows the first error case for a TDD system.

Figure 5:
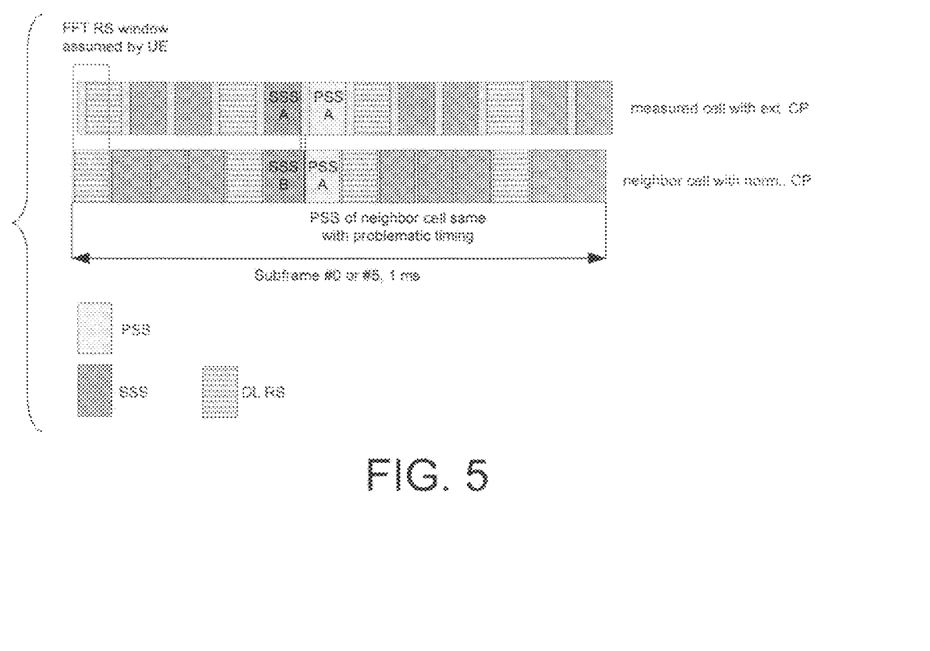
FIG. 5 illustrates a second error case regarding CP length misdetection for a FDD system.
Figure 6:
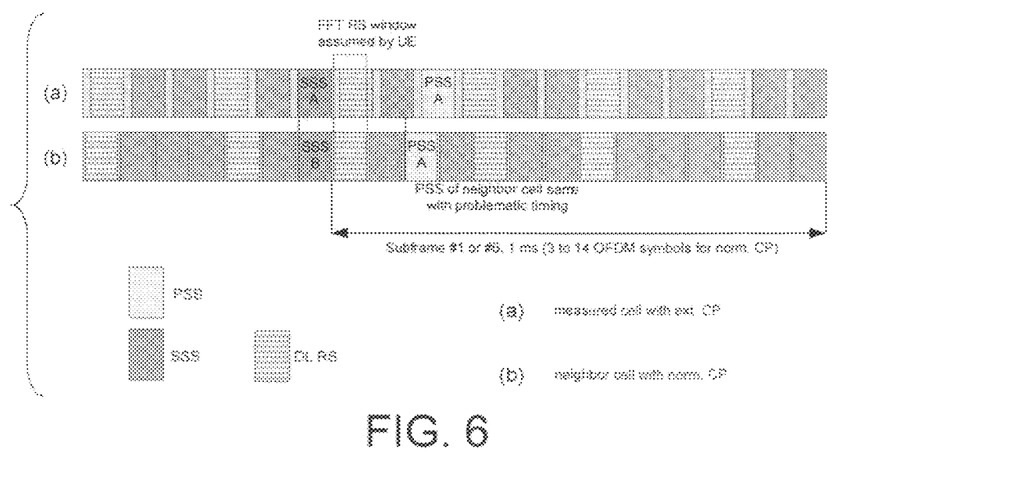
FIG. 6 shows the second error case regarding CP length misdetection for a TDD system.

(ii) The searched/measured cell has an extended CP while the neighbor cell has a normal CP. The neighbor cell uses the same PSS code as the searched/measured cell and the reception timing of the searched/measured cell's PSS is based on the normal CP length instead of the extended CP length. FIG. 5 illustrates the second error case for a FDD system. FIG. 6 shows the second error case for a TDD system.

In both of the above cases, the UE will detect PSS timing according to the neighbor cell and SSS timing and cell ID according to the searched/measured cell. That is, the UE will detect the first cell's ID but the second cell's timing.

In view of the above-identified error cases, it is desirable to employ a mechanism (e.g., in the UE) to detect the CP length or avoid CP length misdetection. Such a detection/verification mechanism is typically based on the DL RS and generally includes a step for calculating correlation between the received DL RS and the DL RS replica. To provide a reliable verification, it is desirable that the RS correlation hypothesis results calculated with the correct timing are very different (e.g., as different as possible) from the RS correlation hypothesis results for the incorrect timing.

The previously-specified DL RS mapping and scrambling initialization for E-UTRAN implies that for a given cell ID and a given subframe number:

(a) All RS sub-carriers will use the same cell-specific frequency shift regardless of the CP length.

(b) The RS in the first OFDM symbol of each sub-frame or slot will use the same Gold (QPSK) scrambling sequence in both cells (because the RS scrambling sequence generator is initialized in the same manner with {OFDM symbol number, subframe number, cell ID} or with {OFDM symbol number, slot number, cell ID}).

Reference with regard to the above may be made to TS 36.211 V8.2.0, "3rd Generation Partnership Project; Technical Specification Group Radio Access Network; Evolved Universal Terrestrial Radio Access (E-UTRA); Physical Channels and Modulation (Release 8)," March 2008. Reference may also be made to this document concerning the specifications for the PSS, SSS, DL RS sequences and mapping.

The above implications suggest that a considerable portion of the DL RS signal (in the first OFDM symbol of each subframe or each slot) will be very similar for both the normal CP and the extended CP. This will make CP length verification more complex and/or less reliable. It should also be noted that the RS in the first OFDM symbol may constitute a large portion of available DL RS symbols and thus be more important for UE measurements and auxiliary functions, for example, in the presence of mixed MBSFN carriers and/or TDD carriers (due to a shorter DL unicast portion of subframes) or for inter-frequency measurements (due to short measurement gaps).

SUMMARY

The below summary section is intended to be merely exemplary and non-limiting.

The foregoing and other problems are overcome, and other advantages are realized, by the use of the exemplary embodiments of this invention.

In one exemplary embodiment of the invention, a method comprising: inserting an indication of a cyclic prefix length into a transmission; and sending the transmission.

In another exemplary embodiment of the invention, an apparatus comprising: a processor configured to insert an indication of a cyclic prefix length into a transmission; and a transmitter configured to send the transmission.

In another exemplary embodiment of the invention, a method comprising: receiving a transmission; and processing the received transmission to obtain an indication of a cyclic prefix length.

In another exemplary embodiment of the invention, an apparatus comprising: a receiver configured to receive a transmission; and a processor configured to process the received transmission to obtain an indication of a cyclic prefix length.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Figure 2A:
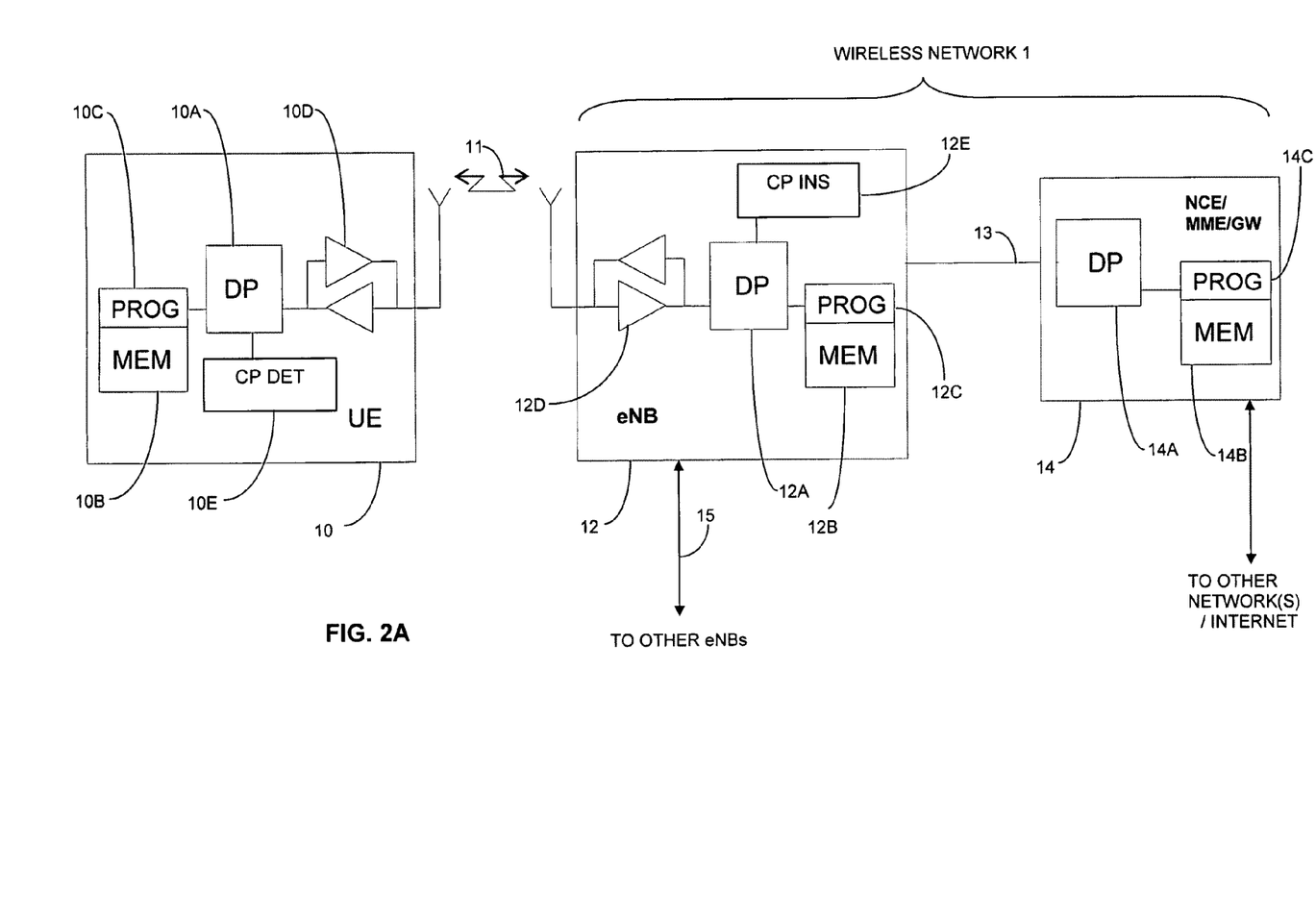
FIG. 2A shows a simplified block diagram of various exemplary electronic devices that are suitable for use in practicing the exemplary embodiments of this invention.

Before describing in further detail the exemplary embodiments of this invention, reference is made to FIG. 2A for illustrating a simplified block diagram of various exemplary electronic devices and apparatus that are suitable for use in practicing the exemplary embodiments of this invention. In FIG. 2A, a wireless network 1 is adapted for communication over a wireless link 11 with an apparatus, such as a mobile communication device which may be referred to as a user equipment (UE) 10, via a network access node, such as a Node B (base station), and more specifically an eNB 12. The network 1 may include a network control element (NCE) 14 that may include the MME/S-GW functionality shown in FIG. 1, and which provides connectivity with one or more other networks, such as a telephone network and/or a data communications network (e.g., the Internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas.

The eNB 12 includes a controller, such as a computer or a data processor (DP) 12A, a computer-readable memory medium embodied as a memory (MEM) 12B that stores a program of computer instructions (PROG) 12C, and a suitable radio frequency (RF) transceiver 12D for communication with the UE 10 via one or more antennas. The eNB 12 is coupled via a data/control path 13 to the NCE 14. As a non-limiting example, the path 13 may be implemented as the S1 interface shown in FIG. 1.

The NCE 14 includes a controller, such as a computer or a data processor (DP) 14A and a computer-readable memory medium embodied as a memory (MEM) 14B that stores a program of computer instructions (PROG) 14C. As noted above, the NCE 14 is coupled via a data/control path 13 to the eNB 12. The eNB 12 may also be coupled to one or more other eNBs via data/control path 15, which may be implemented as the X2 interface shown in FIG. 1, for example.

At least one of the PROGs 10C and 12C is assumed to include program instructions that, when executed by the associated DP 10A, 12A, enable the respective device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a CP detection unit (CP DET) 10E, and the eNB 12 may include a CP indicator insertion unit (CP INS) 12E. As non-limiting examples, the CP DET 10E may enable the UE 10 to detect and/or decode a CP indicator (i.e., an indication of the CP length). Similarly, the CP INS 12E may enable to the eNB 12 to insert a CP indicator (i.e., an indication of the CP length). In further exemplary embodiments, the functions of the CP DET 10E and the CP INS 12E may be performed by one or more other processors or components, such as the DP 10A and/or the DP 12A, as non-limiting examples.

In general, the various embodiments of the UE 10 can include, but are not limited to, mobile nodes, mobile stations, mobile phones, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

Figure 2B:
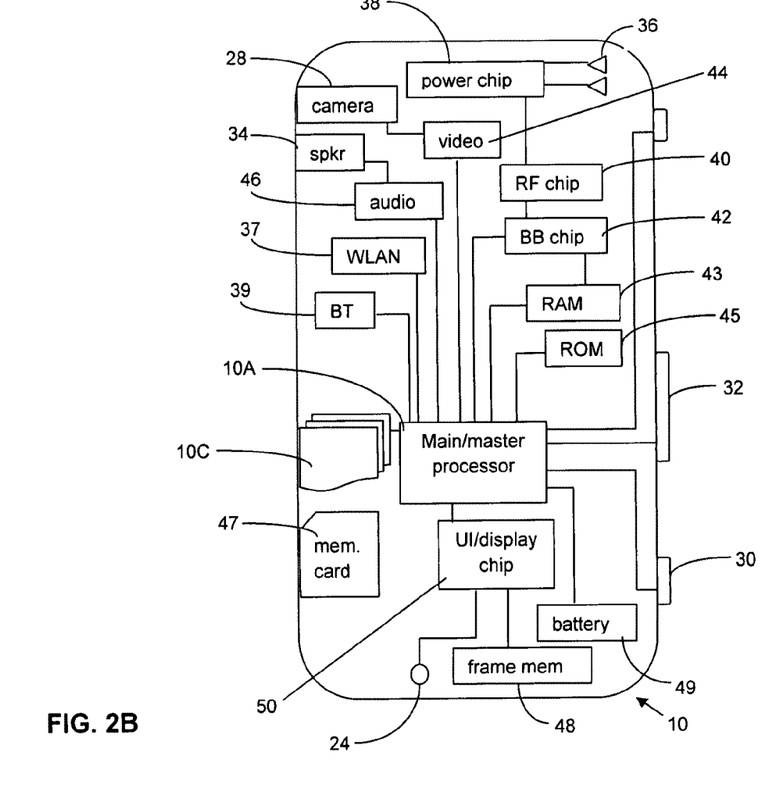
FIG. 2B shows a more particularized block diagram of an exemplary user equipment such as that shown in FIG. 2A.

FIG. 2B illustrates further detail of an exemplary UE 10 in both plan view (left) and sectional view (right). Exemplary embodiments of the invention may be embodied in one or more combinations that include one or more function-specific components, such as those shown in FIG. 2B. As shown in FIG. 2B, the UE 10 includes a graphical display interface 20, a user interface 22 comprising a keypad, a microphone 24 and speaker(s) 34. In further exemplary embodiments, the UE 10 may also encompass touch-screen technology at the graphical display interface 20 and/or voice-recognition technology for audio signals received at the microphone 24. A power actuator 26 controls the UE 10 being turned on and/or off by the user. The UE 10 may include a camera 28, which is shown as forward facing (e.g., for video calls) but may alternatively or additionally be rearward facing (e.g., for capturing images and video for local storage). The camera 28 may be controlled by a shutter actuator 30 and optionally by a zoom actuator 30, which may alternatively function as a volume adjustment for the speaker(s) 34 when the camera 28 is not in an active mode.

Within the sectional view of FIG. 2B are seen multiple transmit/receive antennas 36 that are typically used for wireless communication (e.g., cellular communication). The antennas 36 may be multi-band for use with other radios in the UE. The operable ground plane for the antennas 36 is shown by shading as spanning the entire space enclosed by the UE housing, though in some embodiments the ground plane may be limited to a smaller area, such as disposed on a printed wiring board on which a power chip 38 is formed. The power chip 38 controls power amplification on the channels being transmitted on and/or across the antennas that transmit simultaneously, where spatial diversity is used, and amplifies received signals. The power chip 38 outputs the amplified received signal to the radio frequency (RF) chip 40, which demodulates and downconverts the signal for baseband processing. The baseband (BB) chip 42 detects the signal, which is then converted to a bit-stream and finally decoded. Similar processing occurs in reverse for signals generated in the UE 10 and transmitted from it.

Signals to and from the camera 28 pass through an image/video processor (video) 44, which encodes and decodes the image data (e.g., image frames). A separate audio processor 46 may also be present to control signals to and from the speakers (spkr) 34 and the microphone 24. The graphical display interface 20 is refreshed from a frame memory (frame mem) 48 as controlled by a user interface/display chip 50, which may process signals to and from the display interface 20 and/or additionally process user inputs from the keypad 22 and elsewhere.

Certain exemplary embodiments of the UE 10 may also include one or more secondary radios such as a wireless local area network radio (WLAN) 37 and/or a Bluetooth® radio (BT) 39, which may incorporate one or more on-chip antennas or be coupled to one or more off-chip antennas. Throughout the UE 10 are various memories, such as a random access memory (RAM) 43, a read only memory (ROM) 45, and, in some exemplary embodiments, a removable memory such as the illustrated memory card 47. In some exemplary embodiments, the various programs 10C are stored on the memory card 47. The components within the UE 10 may be powered by a portable power supply such as a battery 49.

The aforesaid processors 38, 40, 42, 44, 46, 50, if embodied as separate entities in the UE 10 or the eNB 12, may operate in a master-slave relationship with respect to the main/master processor 10A, 12A. Exemplary embodiments of this invention may be most relevant to one or more processors (e.g., the main/master processor 10A), though it is noted that other exemplary embodiments need not be disposed in such devices or components, but may be disposed across various chips and/or memories as shown, or disposed within one or more other processors that combine one or more of the functions described above with respect to FIG. 2B. Any or all of these various processors of FIG. 2B may access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which, in some exemplary embodiments, may include an array of tower-mounted antennas rather than the antennas 36 shown in FIG. 2B.

Note that the various processors and/or chips (e.g., 38, 40, 42, etc.) described above may be combined into a fewer number of such processors and/or chips and, in a most compact case, may be embodied physically within a single processor or chip.

While described above in reference to memories, these components may generally be seen to correspond to storage devices, storage circuits, storage components and/or storage blocks. In some exemplary embodiments, these components may comprise one or more computer-readable mediums, one or more computer-readable memories and/or one or more program storage devices.

While described above in reference to processors, these components may generally be seen to correspond to processors, data processors, processing devices, processing components, processing blocks, circuits, circuit devices, circuit components, circuit blocks, integrated circuits and/or chips (e.g., chips comprising one or more circuits or integrated circuits).

One possible approach to the above-noted problems is to obtain the timing information, and thus the CP length, by correlating the hypothesized CP position/length with its copy located at the end of the OFDM symbol. However, the E-UTRAN signal structure is designed such that this correlation and complexity can be avoided.

Thus, it is desirable to provide apparatus, methods, computer program products and techniques that address the above-identified CP length detection issues, and do so further in view of the E-UTRAN signal structure. Exemplary embodiments of the invention provide signaling (e.g., DL RS signaling or one or more messages) that is indicative, explicitly or implicitly, of a CP length. Some exemplary embodiments of the invention use DL RS sequences and/or mappings (e.g., in all RS-bearing OFDM symbols) that are dependent on the CP length. In such a manner, and as an example, there are different DL RS sequences and/or mappings for the normal CP length and the extended CP length. Some exemplary embodiments of the invention provide cyclic prefix length-dependent scrambling of reference signals.

In one exemplary embodiment, the DL RS scrambling initialization includes at least one field (or at least one bit) indicative of the cyclic prefix length. As a non-limiting example, instead of the DL RS initialization as specified in TS 36.211 V8.2.0, the Gold sequence generator initialization may comprise: {CP length indicator, OFDM symbol number, subframe number, cell ID}. As a non-limiting example, the CP length indicator may have a value of "1" for the normal CP and a value of "0" for the extended CP. As a further non-limiting example, the CP length indicator may have a value of "0" for the normal CP and a value of "1" for the extended CP. In other exemplary embodiments, the CP length indicator may comprise different values or a different number of values (e.g., for more than two CP lengths). Note that as specified in TS 36.211 V8.2.0, the Gold sequence generator initialization comprises: {OFDM symbol number, subframe number, cell ID}.

In other exemplary embodiments, instead of adding to the DL RS initializer, the initializer (such as a conventional or previously-specified initializer) is otherwise modified or manipulated in order to indicate the CP length. Various non-limiting examples of such modification or manipulation are described below.

As specified, the DL RS scrambling initialization includes natural OFDM symbol numbering. That is, the RS-bearing OFDM symbols are numbered {0, 4, 7, 11} for a normal CP and {0, 3, 6, 9} for an extended CP.

In one exemplary embodiment of the invention, the DL RS scrambling initialization is modified to indicate the CP length by including reversal OFDM symbol numbering in the first slot of a subframe and natural OFDM symbol numbering in the second slot of the subframe, where said modification is indicative of a certain CP length (e.g., a normal CP length or an extended CP length). For example, assuming reversal of the OFDM symbol numbering for the first slot, the RS-bearing OFDM symbols may be numbered {13, 4, 7, 11} for a normal CP and {11, 3, 6, 9} for an extended CP.

In another exemplary embodiment, a constant, referred to below as a constant k, is added to one or more of the fields, for example, in a DL RS scrambling initialization.

As a non-limiting example, a constant k could be added to the OFDM symbol number to indicate the CP length. For example, with k=1 indicating a normal CP length, the OFDM symbol numbering for a normal CP would be {1, 5, 8, 12} while the OFDM symbol numbering for an extended CP would remain {0, 3, 6, 9}.

As another non-limiting example, a constant k (e.g., where k=1 indicates a normal CP length) could be added to the subframe number.

As specified in TS 36.211 V8.2.0, the cell-specific frequency shift of the DL RS is given by: shift=(cell ID) mod 6. As another non-limiting example, the frequency shift of the DL RS may be modified to be CP length-specific. That is, the frequency shift of the DL RS may be dependent on or may be modified by the CP length or an indication/indicator of the CP length. For example, the shift of the DL RS may be given by: shift=(cell ID+CP length indicator) mod 6.

As another non-limiting example, a CP length-specific phase shift of the DL RS may be utilized. For example, the phase shift of the DL RS may be given by: phase shift=a*<current_generation_method>, where <current_generation_method> refers to the current generation method described in TS 36.211 V8.2.0 and a is a complex constant whose value is dependent on and/or indicative of the CP length. Since both the synchronization signal and the reference signal undergo the same phase shift due to the propagation channel, the relative shift a can be utilized by the receiver to achieve CP length detection.

As another non-limiting example, a CP length-specific fast forwarding or cyclic shifting of the DL RS Gold sequence may be utilized. As specified in TS 36.211 V8.2.0, the fast forwarding of the Gold sequence generator is common for all cells and all CP lengths (equal to 1600 steps) and there is no cyclic shift of the DL RS sequence within DL RS-bearing OFDM symbols. As a variant of this example, cell-specific (e.g., dependent on cell ID) fast forwarding of the DL RS Gold sequence may be utilized and the indication about the CP length can be conveyed as in any of the above examples.

Based on the above, it should be appreciated that use of the exemplary embodiments of the invention does not require an explicit indication of the CP length. For example, and as described in further detail above with respect to various exemplary embodiments, implicit signaling may be utilized such that, for example, the arrangement of information (e.g., fields, bits) in a message or modified values of a message (e.g., a DL message, a DL RS message) are indicative of the CP length.

The exemplary embodiments of the invention provide signaling (e.g., DL RS signaling or messages) that is indicative, explicitly or implicitly, of a CP length. In such a manner, CP length misdetection (e.g., by the UE) can be mitigated and/or avoided.

Furthermore, RS-based CP length verification is simplified. Even though the UE's FFT window may be off the OFDM symbol (even beyond the CP, as in FIGS. 3 and 5), and despite the severely distorted RS constellation, correlation with an incorrect RS sequence will give a very small result while correlation with a correct RS sequence will give a non-negligible result. In addition, and taking this property into account, with different CP length-dependent RS sequences, one can make the verification in "one shot" (per subframe). In contrast, with the same RS sequences for different CPs, one might have to move the window and calculate multiple correlations in order to verify the CP length by finding the peak (i.e., there would be additional complexity).

In some cases, RS-based CP length verification can be avoided. For example, if the RSs are entirely different for different CPs, the UE would not have to verify the CP length at all. That is, regardless, the UE will estimate parameters such as RSRQ/RSRP for each cell. If the CP were incorrectly detected, the UE would stop measurements after a while because it would not see any energy. Even if one RS per subframe or per slot is the same, incorrect CP detection would result in some amount of energy for RSRQ/RSRP measurements and such measurements would not be stopped. In such a case, it may be desirable to verify the CP length prior to performing such measurements (e.g., additional complexity).

Reference, at least with regard to RSRQ and RSRP, may be made to TS 36.214 V8.2.0, "3rd Generation Partnership Project; Technical Specification Radio Access Network; Evolved Universal Terrestrial Radio Access (E-UTRA); Physical layer—Measurements (Release 8)," March 2008.

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

Figure 7:
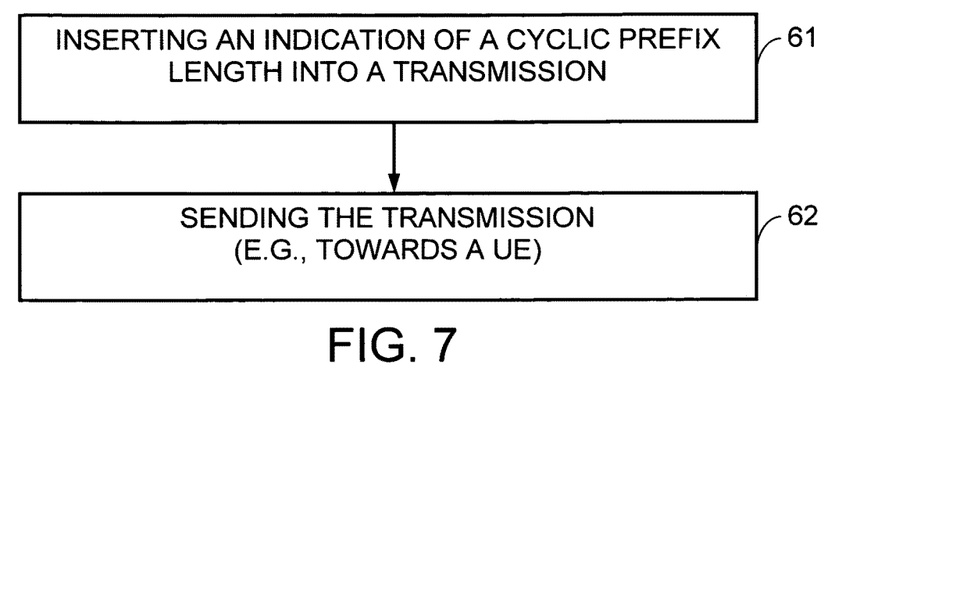
FIG. 7 is a logic flow diagram that illustrates the operation of an exemplary method, and a result of execution of computer program instructions embodied on a computer readable memory, in accordance with the exemplary embodiments of this invention.

(1) In one non-limiting, exemplary embodiment, and as illustrated in FIG. 7, a method comprising: inserting an indication of a cyclic prefix length into a transmission (61); and sending the transmission (e.g., towards a UE) (62).

A method as above, where the indication comprises an explicit indication of the cyclic prefix length. A method as in any above, where the indication comprises an implicit indication of the cyclic prefix length. A method as in any above, where the indication comprises an additional field in the initialization of the transmission (e.g., message/signal). A method as in any above, where the indication comprises at least one bit. A method as in any above, where the cyclic prefix length corresponds to one of a normal cyclic prefix length or an extended cyclic prefix length. A method as in any above, where inserting the indication comprises using at least one additional field for scrambling initialization of the transmission.

A method as in any above, where at least a portion of an OFDM symbol numbering (e.g., in the transmission) is modified to comprise the indication. A method as in any above, where at least a portion of an OFDM symbol numbering (e.g., in the transmission) is reversed to comprise the indication. A method as in any above, where a constant is added to or subtracted from at least a portion of an OFDM symbol numbering (e.g., in the transmission) to comprise the indication. A method as in any above, where a constant is added to or subtracted from a subframe number (e.g., in the transmission) to comprise the indication. A method as in any above, where the indication comprises at least one of: at least a portion of an orthogonal frequency division multiplexing symbol numbering that is modified, at least a portion of a subframe numbering that is modified, a frequency shift that is modified and a phase shift that is modified.

A method as in any above, where a frequency shift is modified to comprise the indication. A method as in any above, where a cell-specific frequency shift is modified to comprise the indication. A method as in any above, where a value is added to a frequency shift to comprise the indication. A method as in any above, where the transmission comprises a DL RS transmission, where a cell-specific frequency shift of the DL RS transmission is modified to comprise the indication. A method as in any above, where a phase shift is modified to comprise the indication. A method as in any above, where a phase shift is multiplied by a value to comprise the indication. A method as in any above, where the transmission comprises a DL RS transmission, where a phase shift of the DL RS transmission is modified to comprise the indication.

A method as in any above, where the transmission comprises a DL transmission. A method as in any above, where the transmission comprises a DL RS transmission. A method as in any above, where the transmission comprises a DL OFDM transmission. A method as in any above, where the transmission comprises a DL RS OFDM transmission. A method as in any above, where the a DL RS initialization is used for the transmission. A method as in any above, where the method is implemented within an E-UTRAN. A method as in any above, where the method is implemented by a network node, an access node, a relay node, a base station or an eNode B. A method as in any above, where the method is implemented by a computer program.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method.

(2) In another non-limiting, exemplary embodiment, a program storage device readable by a machine, tangibly embodying a program of instructions executable by the machine for performing operations, said operations comprising: inserting an indication of a cyclic prefix length into a transmission (61); and sending the transmission (e.g., towards a UE) (62).

A program storage device as in any above, where the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described in further detail herein.

(3) In another non-limiting, exemplary embodiment, an apparatus comprising: a processor configured to insert an indication of a cyclic prefix length into a transmission; and a transmitter configured to send the transmission (e.g., towards a UE). An apparatus as in the previous, further comprising one or more aspects of the exemplary embodiments of the invention as described in further detail herein.

(4) In another non-limiting, exemplary embodiment, an apparatus comprising: means for inserting an indication of a cyclic prefix length into a transmission; and means for sending the transmission (e.g., towards a UE). An apparatus as in the previous, further comprising one or more aspects of the exemplary embodiments of the invention as described in further detail herein. An apparatus as in any above, where the means for inserting comprises at least one processor and the means for sending comprises at least one transmitter.

(5) In another non-limiting, exemplary embodiment, an apparatus comprising: processing circuitry configured to insert an indication of a cyclic prefix length into a transmission; and transmission circuitry configured to send the transmission (e.g., towards a UE). An apparatus as in the previous, further comprising one or more aspects of the exemplary embodiments of the invention as described in further detail herein.

Figure 8:
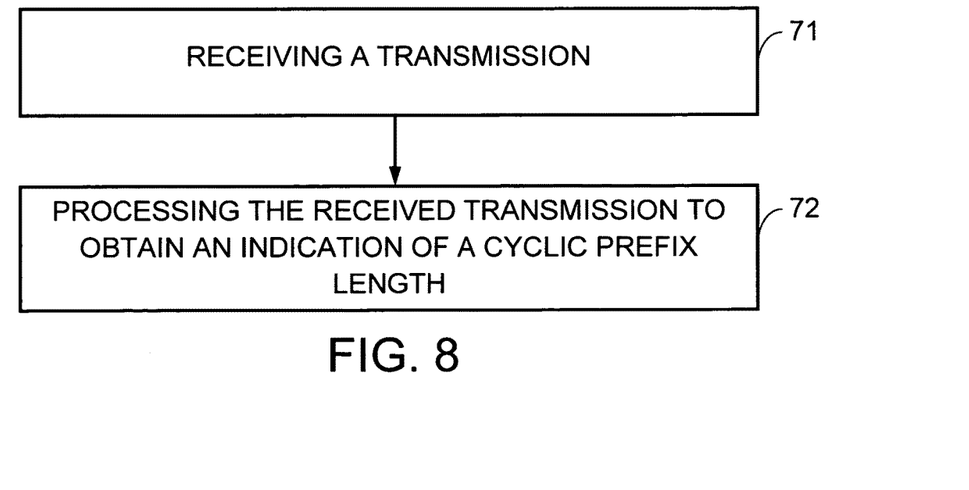
FIG. 8 shows another logic flow diagram that illustrates the operation of another exemplary method, and a result of execution of computer program instructions embodied on a computer readable memory, in accordance with the exemplary embodiments of this invention.

(6) In one non-limiting, exemplary embodiment, and as illustrated in FIG. 8, a method comprising: receiving a transmission (71); and processing the received transmission to obtain an indication of a cyclic prefix length (72).

A method as above, where the indication comprises an explicit indication of the cyclic prefix length. A method as in any above, where the indication comprises an implicit indication of the cyclic prefix length. A method as in any above, where the indication comprises an additional field in the transmission. A method as in any above, where the indication comprises at least one bit. A method as in any above, where the cyclic prefix length corresponds to one of a normal cyclic prefix length or an extended cyclic prefix length. A method as in any above, where processing the received transmission comprises determining the indication based on a scrambling of the transmission.

A method as in any above, where at least a portion of an OFDM symbol numbering (e.g., in the transmission) is modified to comprise the indication. A method as in any above, where at least a portion of an OFDM symbol numbering (e.g., in the transmission) is reversed to comprise the indication. A method as in any above, where a constant is added to or subtracted from at least a portion of an OFDM symbol numbering (e.g., in the transmission) to comprise the indication. A method as in any above, where at least a portion of a subframe numbering (or a subframe number) (e.g., in the transmission) is modified to comprise the indication. A method as in any above, where a constant is added to or subtracted from a subframe number (e.g., in the transmission) to comprise the indication. A method as in any above, where the indication comprises at least one of: at least a portion of an orthogonal frequency division multiplexing symbol numbering that is modified, at least a portion of a subframe numbering that is modified, a frequency shift that is modified and a phase shift that is modified.

A method as in any above, where a frequency shift is modified to comprise the indication. A method as in any above, where a cell-specific frequency shift is modified to comprise the indication. A method as in any above, where a value is added to a frequency shift to comprise the indication. A method as in any above, where the transmission comprises a DL RS transmission, where a cell-specific frequency shift of the DL RS transmission is modified to comprise the indication. A method as in any above, where a phase shift is modified to comprise the indication. A method as in any above, where a phase shift is multiplied by a value to comprise the indication. A method as in any above, where the transmission comprises a DL RS transmission, where a phase shift of the DL RS transmission is modified to comprise the indication.

A method as in any above, where the transmission comprises a DL transmission. A method as in any above, where the transmission comprises a DL RS transmission. A method as in any above, where the transmission comprises a DL OFDM transmission. A method as in any above, where the transmission comprises a DL RS OFDM transmission. A method as in any above, where a DL RS initialization is used for the transmission. A method as in any above, where the method is implemented within an E-UTRAN. A method as in any above, where the method is implemented by a mobile station, a mobile node, a mobile device, a mobile phone, a cellular phone or a UE. A method as in any above, where the method is implemented by a computer program.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method.

(7) In another non-limiting, exemplary embodiment, a program storage device readable by a machine, tangibly embodying a program of instructions executable by the machine for performing operations, said operations comprising: receiving a transmission (71); and processing the received transmission to obtain an indication of a cyclic prefix length (72).

A program storage device as in any above, where the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described in further detail herein.

(8) In another non-limiting, exemplary embodiment, an apparatus comprising: a receiver configured to receive a transmission; and a processor configured to process the received transmission to obtain an indication of a cyclic prefix length. An apparatus as in the previous, further comprising one or more aspects of the exemplary embodiments of the invention as described in further detail herein.

(9) In another non-limiting, exemplary embodiment, an apparatus comprising: means for receiving a transmission;

and means for processing the received transmission to obtain an indication of a cyclic prefix length. An apparatus as in the previous, further comprising one or more aspects of the exemplary embodiments of the invention as described in further detail herein. An apparatus as in any above, where the means for receiving comprises at least one receiver and the means for processing comprises at least one processor.

(10) In another non-limiting, exemplary embodiment, an apparatus comprising: receiver circuitry configured to receive a transmission; and processor circuitry configured to process the received transmission to obtain an indication of a cyclic prefix length. An apparatus as in the previous, further comprising one or more aspects of the exemplary embodiments of the invention as described in further detail herein.

(11) In another non-limiting, exemplary embodiment, a method comprising: modifying a downlink transmission to indicate a cyclic prefix length; and sending the modified downlink transmission (e.g., towards a UE). A method as in the previous, further comprising one or more aspects of the exemplary embodiments of the invention as further described herein. A computer program or apparatus configured to operate in accordance with the method described above.

(12) In another non-limiting, exemplary embodiment, a method comprising: generating a downlink transmission to indicate a cyclic prefix length; and sending the downlink transmission (e.g., towards a UE). A method as in the previous, further comprising one or more aspects of the exemplary embodiments of the invention as further described herein. A computer program or apparatus configured to operate in accordance with the method described above.

(13) In another non-limiting, exemplary embodiment, a method comprising: providing a downlink transmission that is indicative of a cyclic prefix length; and sending the downlink transmission (e.g., towards a UE). A method as in the previous, further comprising one or more aspects of the exemplary embodiments of the invention as further described herein. A computer program or apparatus configured to operate in accordance with the method described above.

(14) In another non-limiting, exemplary embodiment, a method comprising: receiving a downlink transmission; and determining, based on the received downlink transmission or information contained therein, a cyclic prefix length. A method as in the previous, further comprising one or more aspects of the exemplary embodiments of the invention as further described herein. A computer program or apparatus configured to operate in accordance with the method described above.

(15) A system comprising: a mobile station as in any described above or elsewhere herein; and a base station as in any described above or elsewhere herein. A system as in the previous, further comprising one or more aspects of the exemplary embodiments of the invention as further described herein. A method or computer program configured to operate in accordance with the system described above.

The various blocks shown in FIGS. 7 and 8 may be viewed as method steps, as operations that result from operation of computer program code and/or as one or more coupled components (e.g., function blocks, circuits, integrated circuits, logic circuit elements) constructed to carry out the associated function(s). The blocks may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 7 and 8 should be considered merely exemplary and non-limiting. It should be appreciated that the blocks may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 7 and 8 so as to implement one or more further exemplary embodiments of the invention, such as those described in further detail herein.

That is, the non-limiting, exemplary embodiments of the invention shown in FIGS. 7 and 8 may be implemented, practiced or utilized in conjunction with one or more further aspects in any combination (e.g., any combination that is practicable, suitable and/or feasible) and are not limited only to the blocks, steps, functions and/or operations illustrated in FIGS. 7 and 8.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device readable by a machine, tangibly embodying a program of instructions executable by the machine for performing operations. The operations comprise steps of utilizing the exemplary embodiments or steps of the method.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as, for example, ones that utilize signaling having at least two lengths of the CP (e.g., an OFDM signal, a DL OFDM signal).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method for an evolved universal terrestrial radio access network comprising:
   inserting an indication of a type of cyclic prefix length into a transmission comprising a downlink reference signal, wherein the type of cyclic prefix length is one of normal cyclic prefix length and extended cyclic prefix length; and
   using one type of cyclic prefix length in sending the transmission;
   wherein the type of cyclic prefix length is the used one type of cyclic prefix length; and
   wherein inserting the indication comprises using at least one field indicative of the type of cyclic prefix length in initialization of a scrambling sequence, and using the obtained scrambling sequence in generating the downlink reference signal.

2. A non-transitory computer-readable medium storing program instructions, execution of the program instructions by a processor resulting in the steps of performing the method of claim 1.

3. An apparatus comprising:
   a processor; and
   a memory including computer program instructions, the memory and the computer program instructions being configured, with the processor, to cause the apparatus at least to perform:
   insert an indication of a type of cyclic prefix length into a transmission comprising a downlink reference signal, wherein the type of cyclic prefix length is one of normal cyclic prefix length and extended cyclic prefix length; and
   send the transmission using one type of cyclic prefix length within an evolved universal radio access network,
   wherein inserting the indication comprises using at least one field indicative of the type of cyclic prefix length in initialization of a scrambling sequence, and using the obtained scrambling sequence in generating the downlink reference signal; and
   wherein the used one type of cyclic prefix length is the type of cyclic prefix length.

4. The apparatus of claim 3, wherein the apparatus comprises a network node, an access node, a relay node, a base station or an eNode B.

5. A method for an evolved universal terrestrial radio access network comprising:
   receiving a transmission comprising a downlink reference signal, wherein one type of cyclic prefix length is used in the transmission; and
   processing the received transmission,
   wherein processing the received transmission comprises determining an indication of a type of cyclic prefix length from the downlink reference signal,
   wherein the type of cyclic prefix length is one of normal cyclic prefix length and extended cyclic prefix length,
   wherein the indication comprises using at least one field indicative of the type of cyclic prefix length in initialization of a scrambling sequence, and using the obtained scrambling sequence in generating the downlink reference signal, and wherein the used one type of cyclic prefix length is the type of cyclic prefix length.

6. A non-transitory computer-readable medium storing program instructions, execution of the program instructions by a processor resulting in the steps of performing the method of claim 5.

7. An apparatus comprising:
a processor; and
a memory including computer program instructions, the memory and the computer program instructions being configured, with the processor, to cause the apparatus at least to perform:
receive a transmission comprising a downlink reference signal, wherein one type of cyclic prefix length is used in the transmission; and
determine an indication of a type of cyclic prefix length from the downlink reference signal,
wherein the type of cyclic prefix length is one of normal cyclic prefix length and extended cyclic prefix length,
wherein the indication comprises using at least one field indicative of the type of cyclic prefix length in initializing a scrambling sequence, and using the obtained scrambling sequence in generating the downlink reference signal, and
wherein the used one type of cyclic prefix length is the type of cyclic prefix length.

8. The apparatus of claim 7, wherein the apparatus comprises a mobile station or a mobile phone.

9. The method of claim 1, wherein the at least one field indicative of the type of cyclic prefix length is used in an initialization value of a scrambling sequence generator in generating the scrambling sequence.

10. The apparatus of claim 3, wherein the at least one field indicative of the type of cyclic prefix length is used in an initialization value of a scrambling sequence generator in generating the scrambling sequence.

11. The method of claim 5, wherein the at least one field indicative of the type of cyclic prefix length is used in an initialization value of a scrambling sequence generator in generating the scrambling sequence.

12. The apparatus of claim 7, wherein the at least one field indicative of the type of cyclic prefix length is used in an initialization value of a scrambling sequence generator in generating the scrambling sequence.

13. The method of claim 9, wherein the scrambling sequence generator is a Gold sequence generator.

14. The apparatus of claim 10, wherein the scrambling sequence generator is a Gold sequence generator.

15. The method of claim 11, wherein the scrambling sequence generator is a Gold sequence generator.

16. The apparatus of claim 12, wherein the scrambling sequence generator is a Gold sequence generator.

* * * * *